United States Patent [19]

Iwamoto et al.

[11] Patent Number: 4,720,664

[45] Date of Patent: Jan. 19, 1988

[54] WIPER CONTROL SYSTEM

[75] Inventors: Tadashi Iwamoto; Toshiki Ikeda, both of Hiroshima; Yukio Takaishi; Noriyuki Suzuki, both of Aichi, all of Japan

[73] Assignees: Mazda Motor Corporation, Hiroshima; Kabushiki Kaisha Tokai Rika Denki Seisakusho, Aichi, both of Japan

[21] Appl. No.: 908,733

[22] Filed: Sep. 18, 1986

[30] Foreign Application Priority Data

Sep. 19, 1985 [JP] Japan .................. 60-142972[U]
Sep. 19, 1985 [JP] Japan .................. 60-142973[U]
Sep. 19, 1985 [JP] Japan .................. 60-142974[U]

[51] Int. Cl.⁴ .................................................. B60S 1/08
[52] U.S. Cl. .................................... 318/444; 318/443; 318/DIG. 2; 15/250.17

[58] Field of Search .............. 318/443, 444, 452, 484, 318/DIG. 2, 445, 466, 467, 468, 280, 281, 282, 283; 15/250 R, 250 C, 250.12, 250.17, 250.01, 250.02, 250.16

[56] References Cited

U.S. PATENT DOCUMENTS

| | | | |
|---|---|---|---|
| 3,582,732 | 6/1971 | Kovalsky | 318/444 X |
| 3,849,711 | 11/1974 | Elliott et al. | 318/DIG. 2 X |
| 3,902,217 | 9/1975 | Botz et al. | 318/DIG. 2 X |
| 4,393,341 | 7/1983 | Byrne | 318/443 |

*Primary Examiner*—Bentsu Ro
*Attorney, Agent, or Firm*—Finnegan, Henderson, Farabow, Garrett and Dunner

[57] ABSTRACT

A wiper control system having a timing circuit for operating the wiper a predetermined time after the operation of the liquid spray pump commences operation and continues a predetermined time after the liquid spray pump stops. The system operates the wiper at high speed in the washer mode and in one embodiment changes to high speed and in another embodiment changes to low speed upon operation of the wiper to the off mode.

10 Claims, 4 Drawing Figures

WIPER CONTROL SYSTEM

FIELD OF THE INVENTION

The present invention relates to an automobile wiper control system for selecting a high-speed wiping mode, a low-speed wiping mode and a stop mode; and more particularly, relates to such a wiper control system having the capability of operating the wiper in combination with a window washer.

BACKGROUND OF THE INVENTION

In conventional automobile wiper control systems, the wiper is operated at a high speed only when the high-speed wiping mode is selected, i.e., when the low-speed wiping mode, intermittent wiping mode or mist wiping mode is not selected. Furthermore, in the conventional systems, when the window washer is operated, the operation of the wiper is delayed a short time after starting the operation of the window washer, and the wiper is then operated for a predetermined time after the stop of the operation of the window washer. Conventionally, in the case where the window washer is operated, the wiper is operated at a low speed.

However, the number of cars running at a high speed has increased due to superhighway networks. In the case where the window washer is operated during high-speed running, it is desirable that the wiper is operated at a high speed in combination with the window washer, so as to rapidly wipe the window with the washing liquid. However, the wiper of the conventional wiper control systems cannot be operated at a high speed during operation of the window washing system. As a result, these conventional systems do not have a satisfactory degree of safety, which is a problem awaiting solution in the art of wiper control systems.

SUMMARY OF THE INVENTION

It is, therefore, an object of the present invention to eliminate the above-mentioned defects of conventional systems.

Another object of the present invention is a wiper control system which can rapidly perform the motion of removing from the surface of a window water provided by a window washer to improve safety by shortening the time of poor forward visibility.

In order to attain the above and other objects, a wiper control system comprises a wiper motor provided with a high-speed rotary terminal and a low-speed rotary terminal, a wiper switch for selecting at least a high-speed wiping mode, a low-speed wiping mode and a stop mode; an autostop switch for completing a path from an electric power supply to the wiper motor upon initiation of energization of the wiper motor, the electric power supply path being maintained until the wiper returns to a predetermined standby position; a window washer liquid spray pump motor arranged to be driven during a period in which a window washer switch is operated. According to one aspect of the present invention, the provision of a first circuit means including a first relay having a speed-change relay switch operable to energize the motor through the high-speed terminal at times when the wiper switch selects the high-speed wiping mode and the stop mode; and operable to energize the motor through the low-speed terminal at times when the wiper switch selects the low-speed wiping mode; a second circuit means including a second relay is operative to be energized when the wiper switch selects the high-speed wiping mode and the low-speed wiping mode, to complete an electric power supply path for the wiper motor through the speed-change relay switch of the first relay, and a cooperative circuit energizes the second relay in response to the operation of the washer switch deenergizes the second relay a predetermined time after ceasing operation of the washer switch.

Another object of the present invention is to provide a wiper control system which can operate the wiper at a high speed as described above, and is capable of providing a predetermined stop position of the wiper.

To attain these objects, the wiper control system according to another aspect of the invention differs from the wiper control system according to the one aspect of the invention, in that there is provided a first circuit means including a first relay having a speed-change relay switch operative to be energized for selecting the high-speed terminal of the wiper motor at times when the wiper switch selects the high-speed wiping mode; and operative to be deenergized for selecting to the low-speed terminal of the wiper motor at times when the wiper switch selects either the low-speed or the stop position; and a switching means operative to maintain the first relay in the energized state only during the operation of the washer switch, whereby the wiper is driven at a high speed during operation of the window washer, and thereafter the operation of the wiper is returned to the low-speed operation upon operation of the washer switch to the off position.

A further object of the invention is a wiper control system in which low-speed operation is possible when high-speed operation becomes impossible, thereby maintaining safety in the event of malfunction.

To attain this object, the wiper control system according to a further aspect of the invention is different from the wiper control system according to the other aspects of the invention, in that there is provided a first circuit means including a first relay operative to be energized at times when the wiper switch selects the high-speed wiping mode, the first relay having a make-contact relay switch operative to close when the first relay is in its energized state, and a break-contact relay switch operative to close when the first relay is in a deenergized state; a second circuit means including a second relay is operative to be energized when the wiper switch selects the low-speed wiping mode, the second relay completing an electric power supply path for the wiper motor through the low-speed terminal when the second relay is in its energized state, and completing another electric power supply path for the wiper motor through the break-contact relay switch of the first relay and the autostop switch, and a cooperative circuit operative to energize the first relay in response to the operation of the washer switch to the on position, and to deenergize the first relay a predetermined time after operating the washer switch to the off position, whereby the wiper is driven at a high speed during operation of the window washer, and thereafter the operation of the wiper is returned to low-speed operation upon operation of the washer switch to the off position.

Other objects, features, and advantages of the present invention will become apparent from the following description taken in conjunction with the accompanying drawings.

BRIEF DESCRIPTION OF THE DRAWINGS

In the drawings, like reference numerals designate like or corresponding parts.

DETAILED DESCRIPTION OF THE INVENTION

Figure 1:
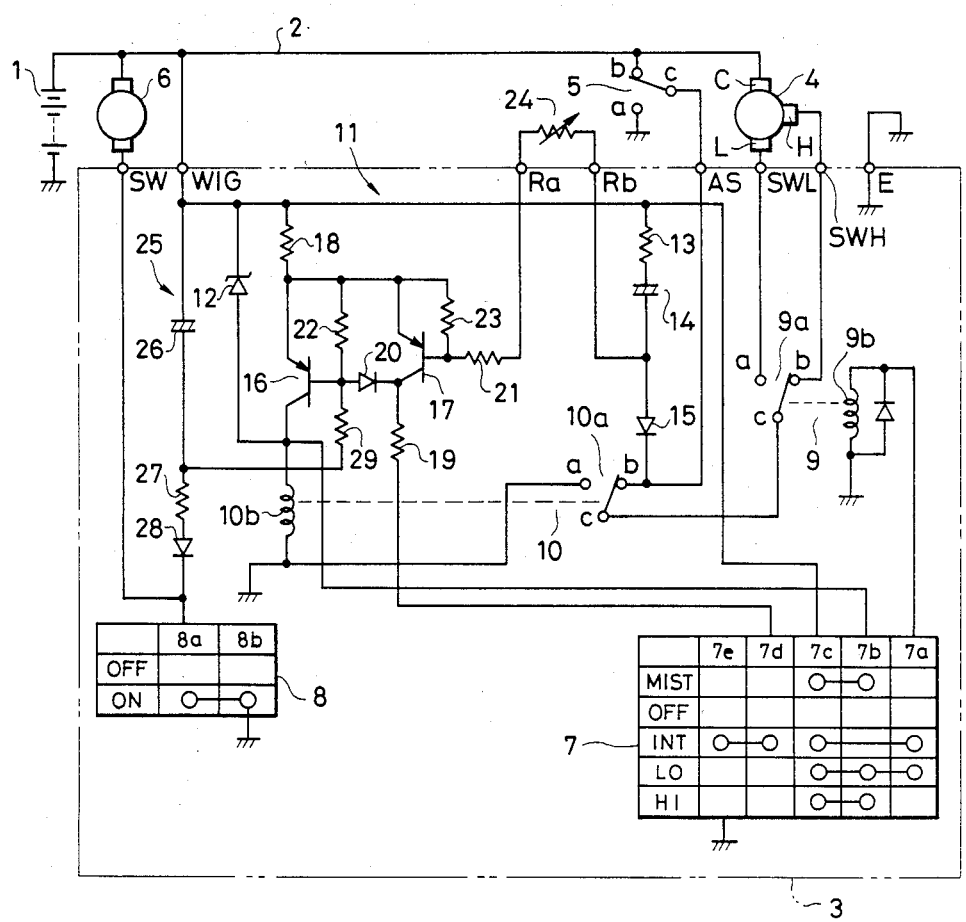
FIG. 1 is a circuit diagram showing a first embodiment of the present invention.

The present invention will be described hereunder with reference to FIG. 1 which shows the first embodiment applied to an automobile wiper control system.

The reference numeral 1 designates a battery in which the plus terminal is connected to a source line 2 and the minus terminal is grounded. The reference numeral 3 designates a substrate which has an SW terminal, a WIG terminal, an Ra terminal, an Rb terminal, an AS terminal, an SWL terminal, an SWH terminal, and an E terminal. The reference numeral 4 designates a wiper motor for driving a front wiper, the motor having a high-speed rotary terminal H and a low-speed rotary terminal L to drive the wiper at a high speed in the case where an electric current flows through the high-speed rotary terminal H or at a low speed in the case where an electric current flows through the low-speed rotary terminal L. The high-speed and low-speed rotary terminals H and L of the wiper motor 4 are connected to the SWH and SWL terminals, respectively, and a common terminal C is connected to the source line 2.

The reference numeral 5 designates a known autostop switch that is provided incidentally to the wiper motor 4. The autostop switch 5 is arranged such that, when the wiper is driven to a wiping position, contacts (c-a) are closed, and when the wiper is returned to a standby position, contacts (c-b) are closed. The fixed contact b is connected to the source line 2; the fixed contact a is grounded; and the movable contact c is connected to the AS terminal. The reference numeral 6 designates a window washer liquid spray pump motor, which is set to spray the front window with the window washer liquid when operated. The reference numeral 7 designates a wiper switch which is provided to select a high-speed wiping mode HI, a low-speed wiping mode LO, an intermittent wiping mode INT, a mist wiping mode MIST, and a stop mode OFF. Upon selection of each of the modes, the terminals 7a to 7e are connected as shown in the drawing (in which the line between the marks "O" expresses a connected state).

In the case where the mist wiping mode is selected, the wiper switch 7 is of a momentary type that is turned on in the presence of operational force to connect the terminals 7b and 7c to each other for a short time. In this case, the terminal 7c of the wiper switch 7 is connected to the WIG terminal and the terminal 7e is grounded. The reference numeral 8 designates a washer switch which is a momentary type that is turned on in the presence of operational force to connect terminals 8a and 8b to each other. The terminal 8a of the washer switch 8 is connected to the SW terminal and the terminal 8b is grounded. The reference numeral 9 designates a first relay which has a speed change relay switch (hereinafter simply referred to as "relay switch") 9a and an excitation coil 9b. The reference numeral 10 designates a second relay that has a relay switch 10a and an excitation coil 10b. These relays 9 and 10 close respective contacts (c-a) of the relay switches 9a and 10a to energize relays 9 and 10, respectively.

The excitation coil 9b is connected between the terminal 7a of the wiper switch 7 and the earth (E terminal); and the excitation coil 10b is connected between the terminal 7b of the wiper switch 7 and earth (E terminal). The respective movable contact c of the relay switches 9a and 10a are connected to each other; the fixed contacts a and b of the relay switch 9a are connected to the SWL and SWH terminals, respectively; and the fixed contacts a and b of the relay switch 10a are connected to the earth (E) and AS terminals, respectively.

The reference numeral 11 designates a timer circuit for controlling the intermittent wiping mode, which will be described in detail hereinafter. In the timer circuit 11, a voltage-regulator diode 12 having the polarity illustrated is connected between the WIG terminal and the terminal 7b of the wiper switch 7; a serial circuit including a resistor 13, a capacitor 14 and a diode 15 having the polarity illustrated is connected between the WIG terminal and the fixed contact b of the relay switch 10a; and a common contact between the capacitor 14 and diode 15 is connected to the Rb terminal.

The reference numerals 16 and 17 designate PNP-type transistors having emitters connected to each other. In these transistors, the emitters are connected via a resistor 18 to the WIG terminal; the collector of one transistor 16 is connected via the excitation coil 10b to the earth (E terminal); the collector of the other transistor 17 is connected via a resistor 19 to the terminal 7d of the wiper switch 7; the base of the transistor 16 is connected, via a diode 20 in the forward direction, to the collector of the transistor 17; the base of the transistor 17 is connected via a resistor 21 to the Ra terminal; and resistors 22 and 23 are connected between the emitters and bases of the transistors 16 and 17, respectively. A potentiometer 24 for adjusting interval time is connected between the terminals Ra and Rb.

Additionally, reference numeral 25 designates a cooperative circuit that is arranged such that a serial circuit including a capacitor 26, a resistor 27 and a diode 28 having the polarity as illustrated, is connected between the WIG terminal and the terminal 8a of the washer switch 8, and that a common contact between the capacitor 26 and resistor 27 is connected via a resistor 29 to the base of the transistor 16 within the timer circuit 11.

The operation of the above-mentioned arrangement will be described hereinafter. When wiper switch 7 is in the stop mode OFF, and when washer switch 8 is not operated, an electric source is disconnected from the wiper motor 4 and pump motor 6 and, accordingly, these motors do not rotate. However, for example, when the wiper switch 7 is changed to the mist wiping mode MIST, the terminals 7b and 7c are connected to each other for a short time to supply an electric current for the excitation coil 10b of the second relay 10 via the terminals 7c and 7b from the source line 2, so that the relay 10 is energized to close the contacts (c-a). At this time, because the excitation coil 9b of the first relay 9 is deenergized, relay switch 9a is operated to close the contacts (c-b), the wiper motor is energized from the source line 2 via the high-speed rotary terminal H, the contacts (c-b) of the relay switch 9a and the contacts (c-a) of the relay switch 10a, so that the wiper is operated at a high speed. Such an operational state continues after the terminals 7b and 7c of the wiper switch 7 are disconnected from each other, because the wiper motor is energized via the contacts (c-a) of the autostop switch 5 as long as the wiper is in a wiping position. Such an operational state ceases only when the wiper returns to the standby position to close the contacts (c-b) of autostop switch 5 to thereby deenergize the wiper motor 4.

When the wiper switch 7 is changed to the mist wiping mode MIST as described above, the wiper is operated once at a high speed. In the case where the wiper switch 7 is changed to the high-speed wiping mode HI, the terminals 7b and 7c are continously connected to close the contacts (c-a) of the relay switch 10a similar to the above example, and accordingly, the wiper motor 4 is energized from the source line 2 via the high-speed rotary terminal H, the contacts (c-b) of the relay swith 9a and the contacts (c-a) of the relay switch 10a, so that the wiper is continuously operated at a high speed to perform a high-speed wiping operation.

In the case where the wiper switch is changed from this state to the stop mode OFF, the excitation coil 10b is deenergized so that the contacts (c-b) of relay switch 10a are closed. Accordingly, the wiper motor 4 is continuously energized during the time that the contacts (c-a) of autostop switch 5 are closed. Thereafter, the wiper returns to the standby position to close the contacts (c-b) of the autostop switch 5 so that the wiper motor 4 is deenergized to stop the high-speed wiping operation.

In the situation where the wiper switch 7 is changed to the low-speed wiping mode LO, the terminals 7a, 7b and 7c are continuously connected to one another. Accordingly, the respective excitation coils 9b and 10b of the first and second relays 9 and 10 are energized from the source line 2 via the terminals 7a, 7b and 7c so that the respective contacts (c-a) of the relay switches 9a and 10a are closed. Accordingly, the wiper motor 4 is energized from the source line 2 via the low-speed rotary terminal L and the respective contacts (c-a) of the relay switches 9a and 10a, so that the wiper motor 4 is continuously operated at a low speed to perform a low-speed wiping operation. When the wiper switch 7 is changed from this state to the stop mode OFF, the relay switches 9a and 10a return to the deenergized state to close the respective contacts (c-b). The wiper motor 4 is energized via the high-speed rotary terminal H during the time that the autostop switch 5 contacts (c-a) are closed. Accordingly, the wiper is operated at a high speed until the wiper returns to the standby position (i.e., until the contacts (c-b) of the autostop switch 5 close).

In the case where the wiper switch 7 is changed to the intermittent wiping mode INT, the terminals 7a and 7c and the terminals 7d and 7e are continuously connected, respectively. Accordingly, the excitation coil 9b of the first relay 9 is energized via the terminals 7a and 7c so that the contacts (c-a) of relay switch 9a are closed and at the same time, a base current flows in the transistor 16 via the diode 20, resistor 19 and the terminals 7d and 7e to turn on the transistor 16 so that the excitation coil 10b of the second relay 10 is energized via the transistor 16 to close the contacts (c-a) of the relay switch 10a. Accordingly, the wiper motor 4 is energized via the low-speed rotary terminal L so that the wiper is operated at a low speed.

When the contacts (c-a) of the autostop switch 5 are closed in response to the operation of the wiper, the capacitor 14 is charged via the contacts (c-a), the diode 15 and the resistor 13 so that a base current corresponding to the charge flows in the transistor 17 via the resistor 21, the potentiometer 24, the diode 15 and the autostop switch 5 to turn on the transistor 17. At this time, because the transistor 16 turns off the turning on of the transistor 17, the excitation coil 10b is deenergized to close the contacts (c-b) of the relay switch 10a. Accordingly, the wiper motor 4 is energized via the contacts (c-a) of the autostop switch 5 and, at the same time, the capacitor 14 is maintained in the charged state.

When the wiper returns to the standby position, the contacts (c-b) of the autostop switch 5 close to deenergize the wiper motor 4 so that the wiping operation of the wiper stops after one wipe. At the same time, the capacitor 14 is discharged via the resistors 13, 18 and 23, the emitter-base path of the transistor 17, the resistor 21 and the potentiometer 24, so that a base current flows into the transistor 17 during the period of discharge to maintain the transistor 17 in the on-state. After the discharge, the transistor 17 turns off and the transistor 16 turns on again, and accordingly, the wiper begins to start at a low speed, as described above. Thus, an intermittent wiping operation is carried out. Interval time in the intermittent wiping operation can be adjusted by changing the time constant for discharging the capacitor 14. Thereafter, in the case where the wiper switch 7 is changed to the stop mode OFF, the intermittent wiping operation stops immediately if the wiper is at the standby position, or stops after the wiper's return to the standby position if the wiper is at the wiping position. In this instance, the wiper is also operated at a high speed until the wiper returns to the standby position in the same manner as when the low-speed wiping mode LO is selected.

When the washer switch 8 is operated to connect the terminals 8a and 8b when the wiper switch 7 is in the stop mode OFF, the pump motor 6 is energized only during the operation of the switch 8 to spray the front window with the window washer liquid. At this time, the capacitor 26 begins to be charged via the resistor 27, the diode 28 and the terminals 8a and 8b. A fixed time after the start of the charge, a base current flows in the transistor 16 via the resistors 29 and 27 and diode 28 to turn on the transistor 16. Accordingly, the contacts (c-a) of the relay switch 10a close as described above to operate the wiper motor 4 at a high speed, which in turn operates the wiper at a high speed. Thereafter, when the operation of the washer switch 8 is released, the pump motor 6 is deenergized to stop the window washer liquid spray and discharge the capacitor 26 via the resistors 18 and 22, the emitter-base path of the transistor 16 and the resistor 29. When the discharge is completed after a fixed delay, the transistor 16 turns off so that the relay switch 10a returns to the deenergized state to close contacts (c-b). Accordingly, the operation of the wiper stops when the wiper returns to the standby position.

In short, according to the first embodiment, where the wiper switch 7 is changed to the stop mode OFF while the wiper operates at a low speed in the low-speed wiping mode LO, or intermittent wiping mode INT, the wiper is automatically changed to high-speed operation and returned to the standby position. Thus, such time is shortened to prevent needless poor front visibility. Also, in the case where the mist wiping mode MIST is selected, the wiper is operated at a high speed; also to prevent poor visibility for a needless length of time. Furthermore, in the case where the washer switch 8 is operated, the wiper is automatically operated at a high speed a fixed delay time after the window washer liquid is sprayed. Also, electricity is supplied to the wiper motor 4 for a fixed period of time after releasing the washer switch 8. Accordingly, the dust and window washer liquid deposited on the front window can be wiped off rapidly due to the wiper operation as described above. Thus, the time of poor visibility is shortened as much as possible. This improves safety particularly during high speed operation of the car.

Figure 2:
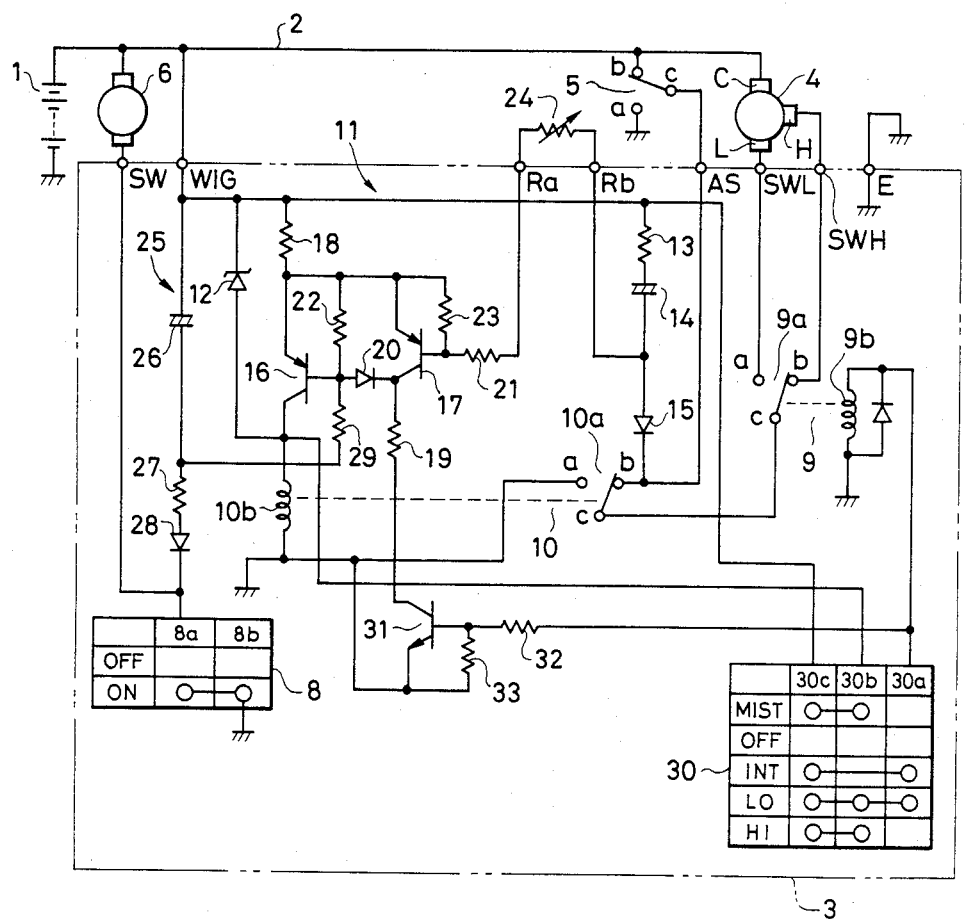
FIG. 2 is a circuit diagram showing a second embodiment of the present invention.

FIG. 2 shows the second embodiment of the present invention, and only the points different from the first embodiment will be described hereunder. This embodiment is characterized in that a wiper switch 30 having fewer terminals is provided in place of the wiper switch 7, and an NPN-type transistor 31 and resistors 32 and 33 are provided to assist the function of the wiper switch 30. The wiper switch 30 is arranged to connect the terminals 30a–30c, in the manner as shown in the drawing, when a high-speed wiping mode HI, a low-speed wiping mode LO, an intermittent wiping mode INT, a mist wiping mode MIST, and a stop mode OFF is selected. The terminals 30a to 30c are connected in the same relationship of the terminals 7a to 7c with respect to the timer circuit 11 as described above in the first embodiment. In the transistor 31, the collector-emitter path is connected between the resistor 19 and the earth (E terminal), and the base is connected to the terminal 30a of the wiper switch 30 via the resistor 32. The resistor 33 is connected between the base and emitter. This embodiment has the same effect as described above in the first embodiment, except that when the wiper switch 30 is changed to the intermittent wiping mode INT the transistor turns on to start the timer circuit 11.

Figure 3:
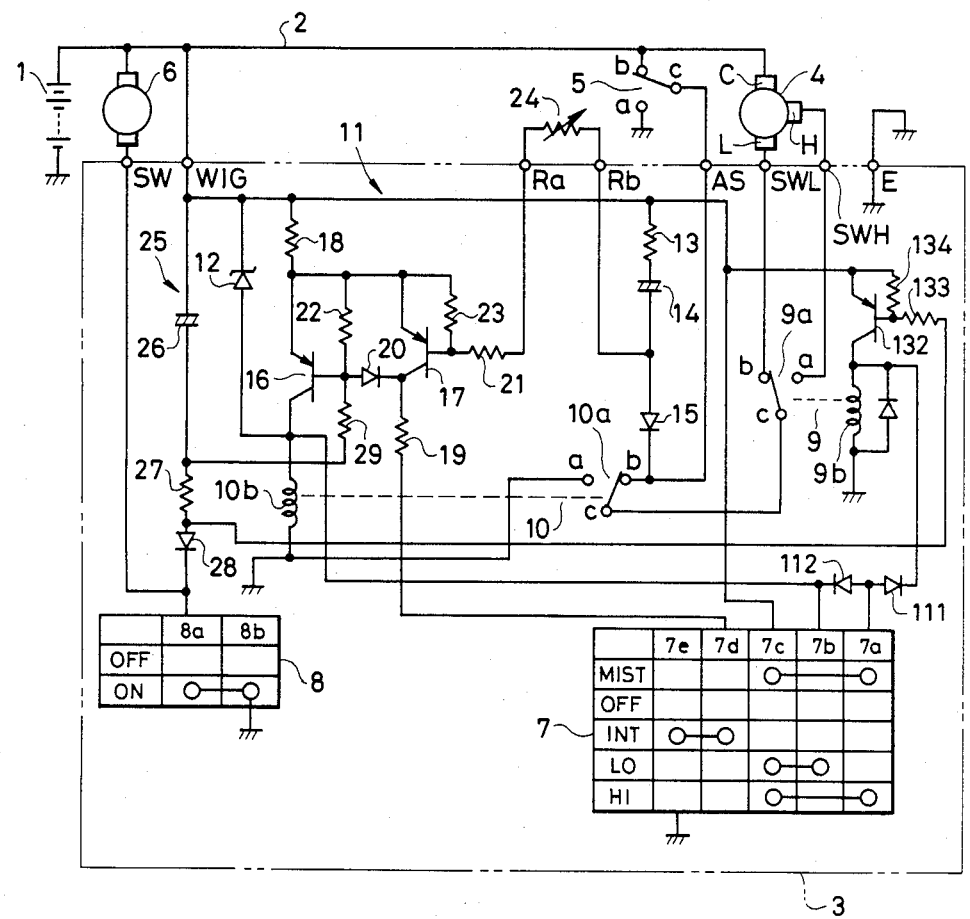
FIG. 3 is a circuit diagram showing a third embodiment of the present invention.

FIG. 3 shows the third embodiment of the present invention, and only the points different from the first embodiment will be described hereunder. When the mist wiping mode MIST is selected, the wiper switch is of a momentary type that connects the terminals 7a and 7c to each other for a short time only in the presence of operational force. The excitation coil 9b is connected, via a diode 111 connected in the forward direction, between the terminal 7a of the wiper switch 7 and the earth (E terminal). The excitation coil 10b has one end connected to the terminal 7b of the wiper switch 7 and connected to the terminal 7a of the wiper switch 7 via a diode 112 having the polarity as illustrated; and the other opposite end connected to the earth (E terminal). The respective movable contacts c of the relay switches 9a and 10a are connected to each other; the fixed contacts a and b of the relay switch 9a are connected to the SWH and SWL terminals, respectively; and the fixed contacts a and b of the relay switch 10a are connected to the earth (E terminal) and the AS terminal, respectively.

The reference numeral 132 designates a switching element, e.g., PNP-type transistor. In the transistor 132, the emitter is connected to the WIG terminal; the collector is grounded via the excitation coil 9b of the first relay 9; the base is connected, via a resistor 133, to the common contact between the resistor 27 and diode 28 within the cooperative circuit 25; and a resistor 134 is connected between the emitter and base.

The operation of the third embodiment will be described hereinafter. When the wiper switch 7 is changed to the stop mode OFF, and the washer switch 8 is not operated, the wiper motor 4 and the pump motor 6 are deenergized. When the wiper switch 7 is changed to the mist wiping mode MIST, the terminals 7a and 7c are connected to each other for a short time so that the excitation coil 9b of the first relay 9 is energized from the source line 2 via the terminals 7c and 7a and the diode 111. The excitation coil 10b of the second relay 10 is also energized from the source line 2 via the terminals 7a and 7c and the diode 112 to cause the relay switches 9a and 10a to close the respective contacts (c-a). As a result, the wiper motor 4 is energized from the source line 2 via the high-speed rotary terminal H and the respective contacts (c-b) of the relay switch 10a, so that the wiper is operated at a high speed.

In the case where the terminals 7a and 7c are thereafter disconnected from each other, the excitation coils 9b and 10b are deenergized to close the respective contacts (c-b) of the relay switches 9a and 10a. The wiper is operated at a low speed, because the wiper motor 4 is energized via the low-speed rotary terminal L, the respective contacts (c-b) of the relay switches 9a and 10a and the contacts (c-a) of the autostop switch 5 as long as the wiper is at the wiping position. Such an operational state stops only when the wiper returns to the standby position to close the contact (c-b) to thereby deenergize the wiper motor 4. When the wiper switch 7 is changed to the mist wiping mode MIST as described above, the wiper is operated once at a high speed.

When the wiper switch 7 is changed to the high-speed wiping mode HI, the terminals 7a and 7c are continuously connected to cause the respective contacts (c-a) of the relay switches 9a and 10a to close similar to the above-mentioned case. Accordingly, the wiper motor 4 is energized from the source line 2 via the high-speed rotary terminal H and the respective contacts (c-a) of the relay switches 9a and 10a, so that the wiper is continuously operated to perform a high-speed wiping operation. In the case where the wiper switch is changed from the HI mode state to the stop mode OFF, the excitation coils 9b and 10b are deenergized so that the relay switches 9a and 10a close their respective contacts (c-b). Accordingly, the wiper motor 4 is maintained energized via the low-speed rotary terminal L only during the time that the autostop switch 5 closes the contacts (c-a), so that the wiper returns to the standby position at a low speed for closing contacts (c-b) of the autostop switch 5 to deenergize the wiper motor 4 from the high-speed wiping operation.

Additionally, in the case where the wiper switch 7 is changed to the low-speed wiping mode LO, the terminals 7b and 7c are continuously connected to each other. Accordingly, the excitation coil 10b of the second relay 10 is energized from the source line 2 via the terminals 7c and 7b to close contacts (c-a) of the relay switch 10a. At this time, the excitation coil 9b of the first relay 9 is in a deenergized state to close the contacts (c-b) of the relay switch 9a. Accordingly, the wiper motor 4 is energized from the source line 2 via the low-speed rotary terminal L, the contact (c-b) of the relay switch 9a and the contact (c-a) of the relay switch 10a, so that the wiper is continuously operated at a low speed to perform a low-speed wiping operation. When the wiper switch 7 is changed from this state to the stop mode OFF, the relay switch 10a returns to the deenergized state to close the contacts (c-b). Accordingly, the wiper motor 4 is deenergized when the wiper returns to the standby position to close the contacts (c-b) of the autostop switch 5.

Moreover, in the case where the wiper switch 7 is changed to the intermittent wiping mode INT, the terminals 7d and 7e are continuously connected to each other. Accordingly, a base current flows into the transistor 16 via the diode 20, the resistor 19 and the terminals 7d and 7e to turn on the transistor 16 so that the excitation coil 10b of the second relay 10 is energized via the thus turned-on transistor 16 to close the contacts (c-a) of the relay switch 10a. At this time, the relay switch 9a is deenergized to close contacts (c-b). Accordingly, the wiper motor 4 is energized via the low-speed rotary terminal L so that the wiper can be operated at a low speed.

When the contact (c-a) of the autostop switch 5 turns on in response to the operation of the wiper, the capacitor 14 is charged via the contacts (c-a) of the autostop switch 5, the diode 15 and the resistor 13 so that a base current, corresponding to the charge, flows into the transistor 17 via the resistor 21, the potentiometer 24, the diode 15 and the autostop switch 5 to turn on the transistor 17. At this time, because the transistor 16 turns off in response to the turning on of the transistor 17, the excitation coil 10b is deenergized so that the contact (c-b) of the relay switch 10a turns on. Accordingly, the wiper motor 4 is energized via the contact (c-a) of the autostop switch 5 and, at the same time, the capacitor 14 is maintained in the charged state. When the wiper returns to the standby position, the contact (c-b) of the autostop switch 5 turns on to deenergize the wiper motor 4 so that the wiping operation of the wiper stops after one wipe. At the same time, the capacitor 14 is discharged via the resistors 13, 18, 23 and 21 and the potentiometer 24, so that a base current flows into the transistor 17 during the discharge to maintain the transistor 17 in the on-state. After the discharge, the transistor 17 turns off, and the transistor 16 turns on again; and accordingly, the wiper begins to start at a low speed as described above. Thus, an intermittent wiping operation is carried out. The interval time in the intermittent wiping operation can be adjusted by adjusting the potentiometer 24 to change the time constant for discharge of the capacitor 14. Thereafter, in the case where the wiper switch 7 is changed to the stop mode OFF, the intermittent wiping operation stops immediately if the wiper is at the standby position, or stops after the wiper's return to the standby position if the wiper is at the wiping position.

When the washer switch 8 is operated to connect the terminals 8a and 8b when the wiper switch 7 is in the stop mode OFF, the pump motor 6 is energized only during the operation of the switch 8 for spraying the windshield with window washer liquid. At the same time, a base current flows into the transistor 132 via the resistor 133 and the diode 28 to turn on the transistor 132. Accordingly, the excitation coil 9b is energized via the transistor 132 to make the contact (c-a) of the relay switch 9a turn on. At this time, the wiper motor 4 is never energized because the relay switch 10a is in the state to close the contact (c-b). Also at the same time as the washer switch 8 is operated, the capacitor 26 begins to be charged via the resistor 27, the diode 28 and the terminals 8a and 8b. A predetermined time period after the start of charge, a base current flows into the transistor 16 via the resistors 29 and 27 and the diode 28 to turn on the transistor 16. Accordingly, the contact (c-a) of the relay switch 10a closes as described above to energize the wiper motor 4 via the high-speed rotary terminal H, so that the wiper is operated at a high speed.

When the operation of the washer switch 8 is released, the pump motor 6 is deenergized to stop the window washer spray, and discharge the capacitor 26 via the resistors 134, 133 and 27 and the resistors 18, 22 and 29. When the discharge is completed after a predetermined time interval, the contacts (c-b) of the relay switch 9a and 10a close. The resistors 27, 29 and 133 are selected to have such suitable resistance values as to turn-off transistor 132 and turn on transistor 16. Accordingly, when the wiper, operated at a low speed, returns to the standby position, the operation stops.

In short, according to the third embodiment, when the washer switch 8 is operated, the wiper is automatically operated at a high speed a predetermined time after the window washer liquid is sprayed, and electricity continues to be supplied to the wiper motor 4 for a predetermined time interval after the release of the washer switch 8. Accordingly, the dust and window washer liquid deposited on the front window can be wiped off rapidly and the time that the forward visibility is poor is shortened to the greatest possible extent. Thus, safety is improved, particularly during high speed operation of the car. Further, in this embodiment, when the operation of the washer switch 8 is released to stop the wiper, the wiper motor is automatically energized via the low-speed rotary terminal. Thus, there is no possibility of chattering in the stop position of the wiper or no possibility of increase in sudden shock upon stopping of the wiper. Furthermore, when the mist wiping mode MIST is selected, the wiper is operated at a high speed, and the time that forward visibility is poor is shortened. In addition, when the wiper is to be stopped in the mist wiping mode and high-speed wiping mode, the wiper is operated at a low speed. Accordingly, there is no possibility of chattering in the stop position of the wiper.

Figure 4:
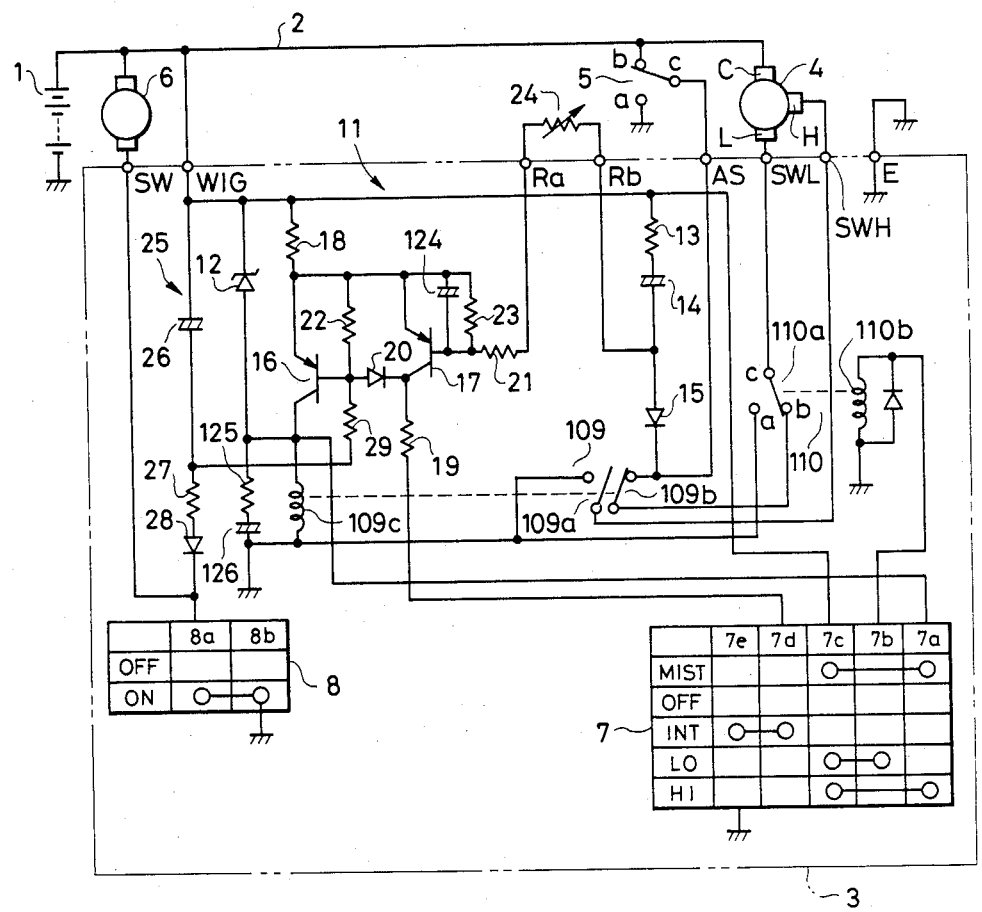
FIG. 4 is a circuit diagram showing a fourth embodiment of the present invention.

FIG. 4 illustrates the fourth embodiment of the present invention, and only the points different from the third embodiment will be described hereunder. The reference numeral 109 designates a first relay having make-contact relay switch 109a, a break-contact relay switch 109b and an excitation coil 109c, the make-contact relay switch 109 is closed when the excitation coil 109c is energized, and the break-contact relay switch 109b is closed when the excitation coil 109c is deenergized. The reference numeral 110 designates a second relay 110b, the relay switch 110a being closed only when the excitation coil 110b is energized. The excitation coil 109c of the first relay 109 has one end connected to the terminal 7a of the wiper switch 7 and the other, opposite end connected to the earth (E terminal), while the excitation coil 110b of the second relay is connected between the terminal 7b of the wiper switch and the earth (E terminal). The make-contact relay switch 109a of the first relay 109 is connected between the SWH terminal and the earth (E terminal), and the break-contact relay switch 109b is connected between the SWL and AS terminals through the contact (c-b of the relay switch 110a. The contacts (c-a) of the relay switch 110a are connected between the SWL terminal and the earth (E terminal).

The reference numeral 11 designates a timer circuit for controlling the intermittent wiping mode, which will be described in detail hereinafter. In the timer circuit 11, a voltage-regulator diode 12 having a polarity as illustrated is connected between the WIG terminal and the terminal 7a of the wiper switch 7; a serial circuit including a resistor 13, a capacitor 14 and a diode 15 having a polarity as illustrated is connected between the WIG terminal and the AS terminal; and a common contact between the capacitor 14 and diode 15 is connected to the Rb terminal. The reference numerals 16 and 17 designate PNP-type transistors having emitters connected to each other. In these transistors, the emitters are connected via a resistor 18 to the WIG terminal; the collector of one transistor 16 is connected via the excitation coil 109c to the earth (E terminal) the collector of the other transistor 17 is connected via a resistor 19 to the terminal 7d of the wiper switch 7; the base of the one transistor 16 is connected, via a diode 20 disposed in the forward direction, to the collector of the other transistor 17; and the base of the other transistor 17 is connected via a resistor 21 to the Ra terminal. A resistor 22 is connected between the emitter and base of the one transistor 16, while a resistor 23 and a capacitor 124 are connected between the emitter and base of the other transistor 17. A serial circuit including a resistor 125 and a capacitor 126 is connected in parallel to the excitation coil 109c. A potentiometer 24 for adjusting interval time is connected between the terminals Ra and Rb.

The operation of the above-mentioned fourth embodiment will be described hereinafter. When the wiper switch 7 is changed to the stop mode OFF and the washer switch 8 is not operated, the wiper motor 4 and the pump motor 6 are not energized and, accordingly, these motors do not rotate. When the wiper switch 7 is changed to the mist wiping mode MIST, the terminals 7a and 7c are connected to each other for a short time to energize the excitation coil 109c of the first relay 109 via the terminals 7c and 7a from the source line 2, so that the make-contact relay switch 109a closes and the break-contact relay switch 109b opens. As a result, the wiper motor 4 is energized, via the high-speed rotary terminal H and the make-contact relay switch 109a, from the source line 2 to operate the wiper at a high speed. When the terminals 7a and 7c of the wiper switch are subsequently disconnected from each other, the excitation coil 109c is deenergized to open the make-contact relay switch 109a and close the break-contact relay switch 109b. At this time, the excitation coil 110b of the second relay 110 is deenergized to close contacts (c-b) of the relay switch 110a. During the time that the wiper is at the wiping position, the wiper motor 4 is energized via the low-speed rotary terminal L, the contact (c-b) of the relay switch 110a, the break-contact relay switch 109b and the contact (c-a) of the autostop switch 5. Accordingly, the wiper begins to be operated at a low speed to the standby position after turning the wiper switch OFF, where contacts (c-b) close to deenergize the wiper motor 4. When the wiper switch 7 is changed to the mist wiping mode MIST as described above, the wiper is operated once at a high speed.

In the case where the wiper switch 7 is changed to the high-speed wiping mode HI, the terminals 7a and 7c are continuously connected to cause the make-contact relay switch 109a to close in the manner as described above; and accordingly, the wiper motor 4 is energized from the source line 2 via the high-speed rotary terminal H and the make-contact relay switch 109a, so that the wiper is continuously operated to perform a high-speed wiping operation. In the case where the wiper switch is changed from the HI state to the stop mode OFF, the excitation coil 109c is deenergized so that the break-contact relay switch 109b returns to the closed condition. Accordingly, the wiper motor 4 is continuously energized during the time that the autostop switch 5 causes the contacts (c-a) to be closed. Thereafter the wiper returns at a lower speed to the standby position to where the contacts (c-b) of the autostop switch 5 are closed; and the wiper motor 4 is deenergized to stop the high-speed wiping operation.

In the case where the wiper switch 7 is changed to the low-speed wiping mode LO, the terminals 7b and 7c are continuously connected to each other; and, the excitation coil 110b of the second relay 110 is energized from the source line 2 via the terminals 7c and 7b to close contacts (c-a) of the relay switch 110a. Accordingly, the wiper motor 4 is energized from the source line 2 via the low-speed rotary terminal L and the contacts (c-a) of the relay switch 110a, so that the wiper is continuously operated to perform a low-speed wiping operation. When the wiper switch 7 is changed from this LO state to the stop mode OFF, the relay switch 110a returns to the deenergized state to close the contact (c-b). Thus, the wiper motor 4 is deenergized only when the wiper returns to the standby position to close the contact (c-b) of the autostop switch 5.

Further, in the case where the wiper switch 7 is changed to the intermittent wiping mode INT, the terminals 7d and 7e are continuously connected to each other. A base current flows into the transistor 16 via the diode 20, the resistor 19 and the terminals 7d and 7e to thereby turn on transistor 16. Through the thus turned-on transistor 16, the excitation coil 109c of the first relay 109 is energized to close the make-contact 109a relay switch. Accordingly, the wiper motor 4 is energized via the high-speed rotary terminal H so that the wiper begins to be operated at a high speed. When the contact (c-a) of the autostop switch 5 closes in accordance with the operation of the wiper, the capacitor 14 is charged via the contact (c-a), the diode 15 and the resistor 13 so that a base current corresponding to the charge flows into the transistor 17 via the resistor 21, the potentiometer 24, the diode 15 and the autostop switch 5 to turn on the transistor 17. At this time, because the transistor 16 turns off in response to the turning on of the transistor 17, the excitation coil 109c is deenergized to open the make-contact relay switch 109a, and close the break contact relay switch 109b. Accordingly, the wiper motor 4 is energized via the low-speed rotary terminal L, the contact (c-b) of the relay switch 110a, the break-contact relay switch 109b and the contact (c-a) of the autostop switch 5 to change the wiper to the state of low-speed operation, and the capacitor 14 is maintained in the charged state.

When the wiper returns to the standby position, the contact (c-b) of the autostop switch 5 closes to deenergize the wiper motor 4 so that the wiping operation of the wiper stops after a single wipe. At the same time, the charged capacitor 14 is discharged via the resistors 13, 18, 23 and 21 and the potentiometer 24, so that a base current flows into the transistor 17 during the period of discharge to maintain the transistor 17 in the on-state. After the discharge, the transistor 17 turns off and the transistor 16 turns on again, and accordingly, the wiper begins to start at a high speed, and sequentially turns to low speed as described above. Thus, an intermittent wiping operation is carried out. Interval time in the intermittent wiping operation can be adjusted by changing the time constant of discharge for the capacitor 14. Therefore, in the case where the wiper switch 7 is changed to the stop mode OFF, the intermittent wiping operation stops immediately if the wiper is at the standby position or stops after the wiper's return to the standby position, if the wiper is at the wiping position. In the latter case, the wiper is operated at a low speed until the wiper reaches the standby position.

When the washer switch 8 is operated to connect the terminals 8a and 8b to each other, and the wiper switch 7 is in the stop mode OFF, the pump motor 6 is energized only during the operation of the switch 8 to spray the window washer liquid. At this time, the capacitor 26 begins to be charged via the resistor 27, the diode 28 and the terminals 8a and 8b. A predetermined time after the start of charging, a base current flows into the transistor 16 via the resistors 29 and 27 and the diode 28 to turn on transistor 16. Accordingly, the make-contact relay switch 109a closes in the manner described above to operate the wiper motor 4 at high speed. Thereafter, when the operation of the washer switch 8 is released, the pump motor 6 is deenergized to stop the window washer liquid spray, and discharge the capacitor 26 via the resistors 18, 22 and 29. When the discharge is completed after a predetermined delay, the transistor 16 turns off so that the break-contact relay switch 109b closes which causes the motor 4 to operate at low speed until the operation of the wiper stops in the standby position.

While preferred embodiments have been described, it is to be understood that the present invention is not limited to the specific embodiments as described above and as illustrated in the drawings, and that various modifications may be made without departing from the spirit and scope thereof. For example, an intermittent wiping mode and a mist wiping mode may be provided if necessary.

According to the present invention, it is apparent from the above-description that the motion of removing the dust and window washer fluid from the surface of the window can be done rapidly to improve safety and that, when the motion ceases, the wiper can rapidly return from the wiping position to the standby position to shorten poor visibility caused by the wiper.

Furthermore, another practical effect is that the wiper control system of the invention can provide a predetermined stop position of the wiper where the wiper is operated at a high speed in combination with the window washer.

In addition, according to the present invention, because of the circuit includes a relay having a make-contact closed for high-speed operation and a break-contact closed for stop operation, low-speed wiping is always carried out whenever there is a relay malfunction for wiping at high speed which provides an additional safety feature.

What is claimed is:

1. A wiper control system comprising:
a wiper motor having a high-speed terminal and a low-speed terminal for operating a wiper at a selected high-speed or a selected low-speed when energized through the corresponding terminal;
a wiper switch operable to select in the alternative at least a high-speed wiping mode, a low-speed wiping mode, and a stop mode;
first circuit means including a first relay having a speed-change relay switch operable to form a partial electric power supply path to said motor through said high-speed terminal at times when said wiper switch selects said high-speed wiping mode and said stop mode, and operable to form a partial electric power supply path to said motor through said low speed terminal at times when said wiper switch selects said low-speed wiping mode;
an autostop switch operative to complete said formed partial electric power supply path for said wiper motor through said speed-change relay switch of said first relay upon initiation of energization of said wiper motor, said electric power supply path being maintained until said wiper returns to a predetermined standby position;
second circuit means including a second relay operative to be energized when said wiper switch selects said high-speed wiping mode and said low-speed wiping mode, to complete said formed partial electric power supply path for said wiper motor through said speed-change relay switch of said first relay;
a window washer liquid spray pump motor operative to be energized at times when a washer switch is operated to its ON position; and
a cooperative circuit for energizing said second relay in response to the operation of said washer switch and to deenergize said second relay at the end of a predetermined time interval after the operation of said washer switch to the OFF position.

2. A wiper control system comprising:
a wiper motor having a high-speed terminal and a low-speed terminal for operating a wiper at a selected high-speed or a selected low-speed when energized through the corresponding terminal;
a wiper switch operable to select in the alternative at least a high-speed wiping mode, a low-speed wiping mode, and a stop mode;
first circuit means including a first relay having a speed-change relay switch, said relay being energized to form a partial electric power supply path to said motor through said relay switch and said high-speed terminal at times when said wiper switch selects said high-speed wiping mode and deenergized to form a partial electric power supply path to said motor through said relay switch and said low-speed terminal at times when said wiper switch selects said low-speed wiping mode and said stop mode;
an autostop switch operative to complete said formed electric power supply path for said wiper motor through said speed-change relay switch upon initiation of energization of said wiper motor, said completed electric power supply path being maintained until said wiper returns to a predetermined standby position;
second circuit means including a second relay operative to be energized when said wiper switch selects said high-speed wiping mode and said low-speed wiping mode, to complete said formed electric power supply path for said wiper motor through said speed-change relay switch;
a window washer liquid spray pump motor energized in response to the operation of a washer switch to the ON position;
a cooperative circuit for operating said second relay in response to the operation of said washer switch and to stop the operation of said second relay at the end of a predetermined time interval after operating said washer switch to the OFF position; and a switching means operative to maintain said first relay in said energized state only during the operation of said washer switch to the ON position.

3. A wiper control system comprising:
a wiper motor having a high-speed terminal and a low-speed terminal for operating a wiper at a selected high-speed or a selected low-speed when energized through the corresponding terminal;
a wiper switch operable to select in the alternative a high-speed wiping mode, a low-speed wiping mode, and a stop mode;
first circuit means including a first relay energized in response to said wiper switch selecting said high-speed wiping mode, to close a make-contact relay switch and open a break-contact relay switch;
an autostop switch for completing a first electric power supply path for said wiper motor through said make-contact relay switch upon initiation of energization of said wiper motor, said first electric power supply path being maintained until said wiper returns to a predetermined standby position;
second circuit means including a second relay energized in response to the operation of said wiper switch to select said low-speed mode, for completing a second electric power supply path for said wiper motor through said low-speed terminal and to complete a third electric power supply path for said wiper motor through said break-contact relay switch of said first relay and said autostop switch;
a window washer liquid spray pump motor operative to be energized in response to the operation of a washer switch to the ON position; and
a cooperative circuit for energizing said first relay in response to the operation of said washer switch and to deenergize said first relay at the end of a predetermined time interval after operating said washer switch to the OFF position whereby said wiper motor is energized through said high-speed terminal and said closed make-contact relay switch at times when said first relay is energized.

4. A wiper control system, comprising:
a wiper motor having a high speed terminal and a low speed terminal to drive a wiper between a wiping position and a standby position, at a selected low speed or a selected high speed when energized;
a washer liquid spray means operative when energized to spray a window;
a window washer switch operable to an ON position and an OFF position;
a wiper switch operable to select in the alternative at least a high speed mode, a low speed mode, and a stop mode;
a first relay means having a speed change switch operable to a low speed condition when in a first state and to a high speed condition when in a second state;
an autostop switch operable to a first condition when the wiper is in said standby position and a second condition when in said wiping position;
first circuit means including said first relay means for energizing said motor at a selected high speed or a selected low speed through said speed change switch at times when said wiper switch selects either said high speed mode or said low speed mode, respectively; and
second circuit means including said wiper switch in said stop mode responsive to the operation of the washer switch to the ON postition to energize said motor at a high speed a predetermined time after said washer liquid spray means is energized, said second circuit means being operative for a predetermined time after said washer switch is operated to an OFF position to operate said motor at a speed governed by said autostop switch while said autostop switch is in said second condition.

5. A wiper control system according to claim 4, wherein said second circuit means is operative to energize said motor at a low speed for said predetermined time after said washer switch is operated to the OFF position.

6. A wiper control system according to claim 4, wherein said second circuit means is operative to energize said motor at a high speed for said predetermined time after said washer switch is operated to the OFF position.

7. A system according to claim 4, wherein said speed change switch includes a first switch connecting the speed change switch to said high speed terminal when said speed change switch is in said second state and a second switch connecting the speed change switch to said low speed terminal when said speed change switch is in said first state, and wherein said first circuit means further include a second relay means having a switching means operated to a first mode when deenergized and a second mode when energized, said first circuit means including means to energize said motor at said low speed when said second relay means is energized, and includes means to energize said motor at said high speed when said second relay means is deenergized through said speed change switch of said first relay means in said first state and said autostop switch.

8. A wiper control system, comprising:
a wiper motor having a first speed terminal and a second speed terminal to selectively drive a wiper between a wiping position and a standby position at a selected first speed or a selected second speed when energized;
a washer liquid spray means operative when energized to spray a window;
a window washer switch operable to an ON position and an OFF position;
a wiper switch operable to select in the alternative at least a first speed mode, a second speed mode, and a stop mode;
a first relay means having a speed change switch connected to the first speed terminal when energized and to the second speed terminal when deenergized;
an autostop means operable to a first condition when the wiper is in said standby position and a second condition when in said wiping position;
a second relay means having a relay switch connecting in speed change switch to said autostop means when deenergized and connecting the speed change switch to one terminal of an energy source when energized;
first circuit means responsive to the operation of the wiper switch to the first speed mode for energizing said first and second relay means to operate the motor at the first speed, through said speed change switch and said one terminal of the energy source;
second circuit means responsive to the operation of the wiper switch to the second speed mode for energizing said second relay means to operate the motor at said second speed through the speed change switch, the second relay switch, and the energy source;

third circuit means responsive to the operation of the washer switch to the ON position while the wiper switch is in the stop mode to energize said washer liquid spray means; and timing circuit means including the winding of said second relay means responsive to the operation of said washer switch to energize said second relay means a predetermined time after operating the washer switch to the ON position to operate the motor at said second speed, said timing circuit means being responsive to the operation of the washer switch to the OFF position to deenergize said second relay means at the end of a predetermined time interval after operation to said OFF position for controlling the operation of the wiper through said autostop switch and said speed change switch of said first relay means.

9. A control system according to claim 8 wherein said second speed corresponds to a high speed and said first speed corresponds to a low speed.

10. A control system according to claim 9 wherein said timing circuit means and said autostop means includes means to operate said motor at low speed upon operation of said washer switch to the OFF position while the wiper is in said wiping position.

* * * * *